United States Patent [19]

Pontarollo

[11] Patent Number: 5,619,914
[45] Date of Patent: Apr. 15, 1997

[54] SORTER-COMPACTOR FOR URBAN REFUSE

[76] Inventor: Jean P. Pontarollo, 32, Via Manzoni - 20091 Bresso, Milan, Italy

[21] Appl. No.: 515,810

[22] Filed: Aug. 16, 1995

[30] Foreign Application Priority Data

Aug. 18, 1994 [IT] Italy .................. MI94A1754

[51] Int. Cl.$^6$ .................. B30B 15/14; B30B 9/30
[52] U.S. Cl. .................. 100/49; 100/53; 100/223; 100/229 A; 100/250; 100/256
[58] Field of Search .................. 100/48, 49, 53, 100/221, 223, 229 R, 229 A, 250, 256

[56] References Cited

U.S. PATENT DOCUMENTS

| | | | |
|---|---|---|---|
| 186,452 | 1/1877 | Bollinger | 100/223 |
| 525,841 | 9/1894 | Davis et al. | 100/223 |
| 4,256,033 | 3/1981 | Poznanovic | 100/223 |
| 4,387,633 | 6/1983 | Ballantyne | 100/250 |
| 5,119,722 | 6/1992 | Carter et al. | 100/221 |
| 5,172,630 | 12/1992 | Thompson | 100/193 |
| 5,257,577 | 11/1993 | Clark | 100/99 |
| 5,259,304 | 11/1993 | Roberts | 100/99 |

FOREIGN PATENT DOCUMENTS 9216358  3/1993  Germany .

*Primary Examiner*—Stephen F. Gerrity
*Attorney, Agent, or Firm*—Steinberg, Raskin & Davidson, P.C.

[57] ABSTRACT

The sorter-compactor (10) for urban refuse comprises: a sorting drum (24) rotatable about its axis (22), the drum being provided with at least two compartments (26, 28, 30, 32) of identical shape and dimensions, of which each compartment, intended to receive one type of refuse, extends parallel to the drum axis of rotation (22), has a constant cross-section along its entire length and has at least one of ills two open ends closable by a relative cover (60, 62, 64, 66); and a compacting device (34, 38) comprising a piston element (34) slidable in the two directions within any one of the compartments (26, 28.30, 32) when the piston element (34) is located in correspondence with that compartment, and an actuator (38) for operating the piston (34) in the two directions so as to compress the refuse contained in the relative compartment against the corresponding closure cover (60, 62, 64, 66).

20 Claims, 4 Drawing Sheets

5,619,914

SORTER-COMPACTOR FOR URBAN REFUSE

FIELD OF THE INVENTION

This invention relates to a sorter-compactor for urban refuse.

BACKGROUND OF THE INVENTION

The increasing production of urban refuse is known to give rise to serious refuse disposal problems. It is now a commonly held expert opinion that one way of reducing the seriousness of the problem is to recover from the refuse those materials which can be usefully recycled, achieving the simultaneous significant advantage of reducing the quantity of refuse for disposal. It is also known that the economically most convenient moment for sorting the various types of refuse to recover material for recycling is at the formation of the refuse itself.

Refuse also occupies a volume which is normally considerable when compared with its mass. It would therefore be very convenient to be also able to reduce its volume at the act of sorting, with obvious benefits in terms of transport costs, storage, disposal or recycling.

OBJECTS AND SUMMARY OF THE INVENTION

The object of the present invention is to provide an apparatus which facilitates sorting the various types of refuse at its source (ie at the formation of the refuse) and which simultaneously enables it to be compacted in order to substantially reduce its volume. This double object is attained by the sorter-compactor according to the present invention, comprising:

a sorting drum rotatable about its axis, the drum being provided with at least two compartments of identical shape and dimensions, in which each of said compartments, intended to receive one type of refuse, extends parallel to the drum axis of rotation, has a constant cross-section along its entire length and has at least one of its two open ends closable by means of a relative cover; and a compacting device comprising a piston element slidable in the two directions within any one of said compartments when the piston element is located in correspondence with that compartment, and an actuator for operating the piston in the two directions so as to compress the refuse contained in the relative compartment against the corresponding closure cover.

BRIEF DESCRIPTION OF THE DRAWINGS

The invention will be more apparent from the following description of one embodiment thereof, given by way of example. In this description reference is made to the accompanying drawings, in which.

DETAILED DESCRIPTION OF THE INVENTION

Figure 1:
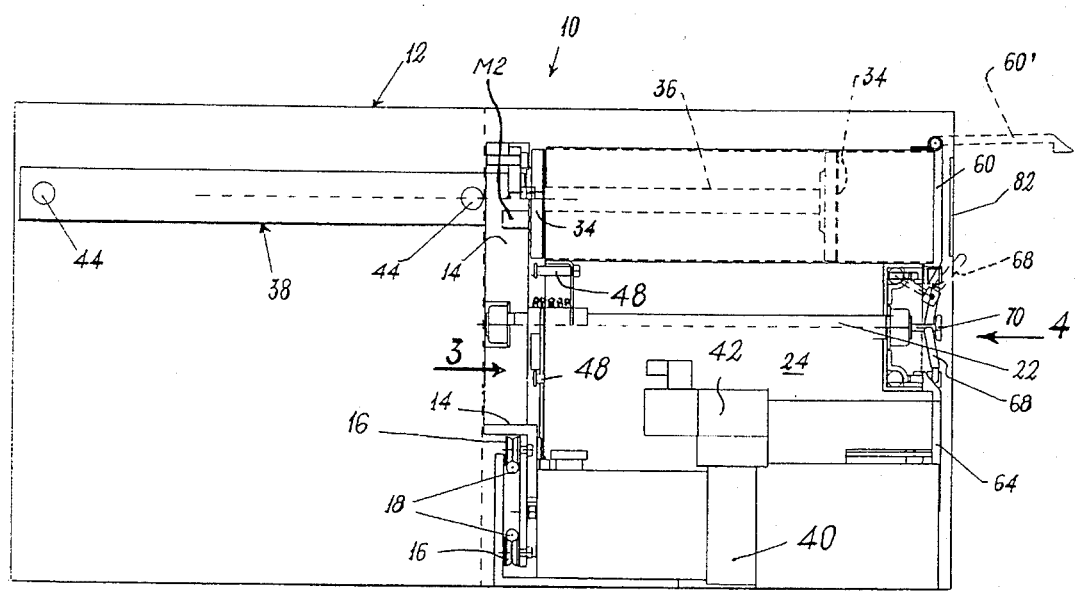
FIG. 1 is a rear view of the apparatus according to the present invention, from which the front parts of the casing enclosing the apparatus have been removed.
Figure 2:
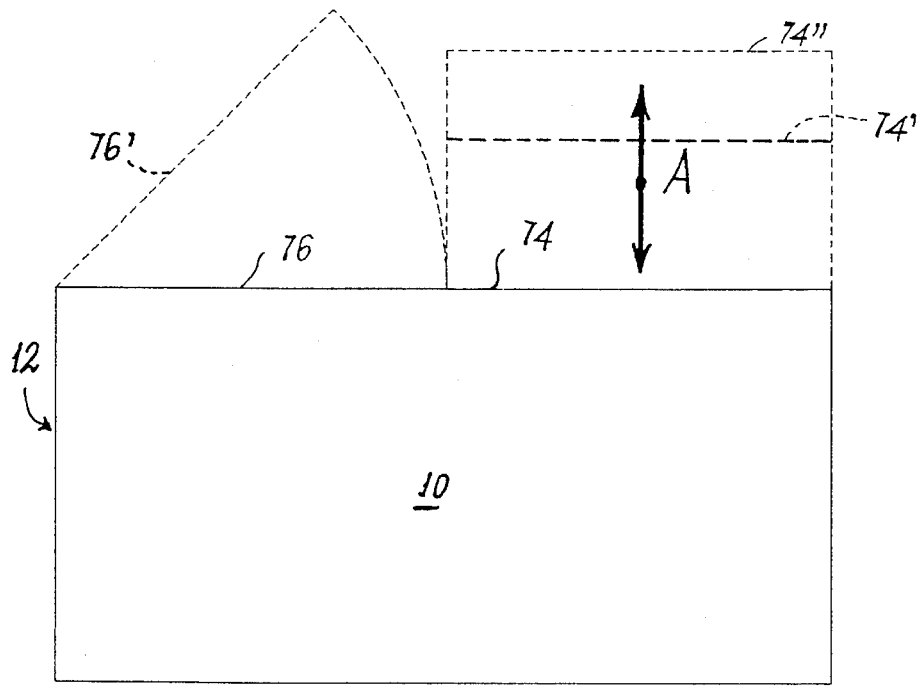
FIG. 2 is a plan view thereof from above, the method of opening the relative doors of the apparatus being shown in this figure by dashed lines.

As can be seen from FIGS. 1 to 5, the sorter-compactor apparatus 10 comprises a parallelepiped casing 12. The casing 12, shown very schematically in the figures, can be conveniently constructed in a manner similar to Common kitchen cabinets. The actual apparatus, enclosed by the casing 12, is supported by a frame 14 slidingly supported, via wheels 16, on guides 18 fixed to the casing 12, to enable that part of the apparatus carried by the frame 14 to be partly or totally extracted from the casing 12 in the direction of the arrow A (FIGS. 2 and 5) as described hereinafter. A horizontal shaft 22 on which a rigid drum 24 is rotatably mounted is rigidly fixed to the frame 14. In this specific case, the drum is divided internally into four compartments visible in FIG. 3 and indicated by 26, 28, 30 and 32 respectively. It is however apparent that the number of compartments can be other than four (but obviously not less than two or there would be no sorting), this number depending on the number of types of refuse to be sorted.

Figure 3:
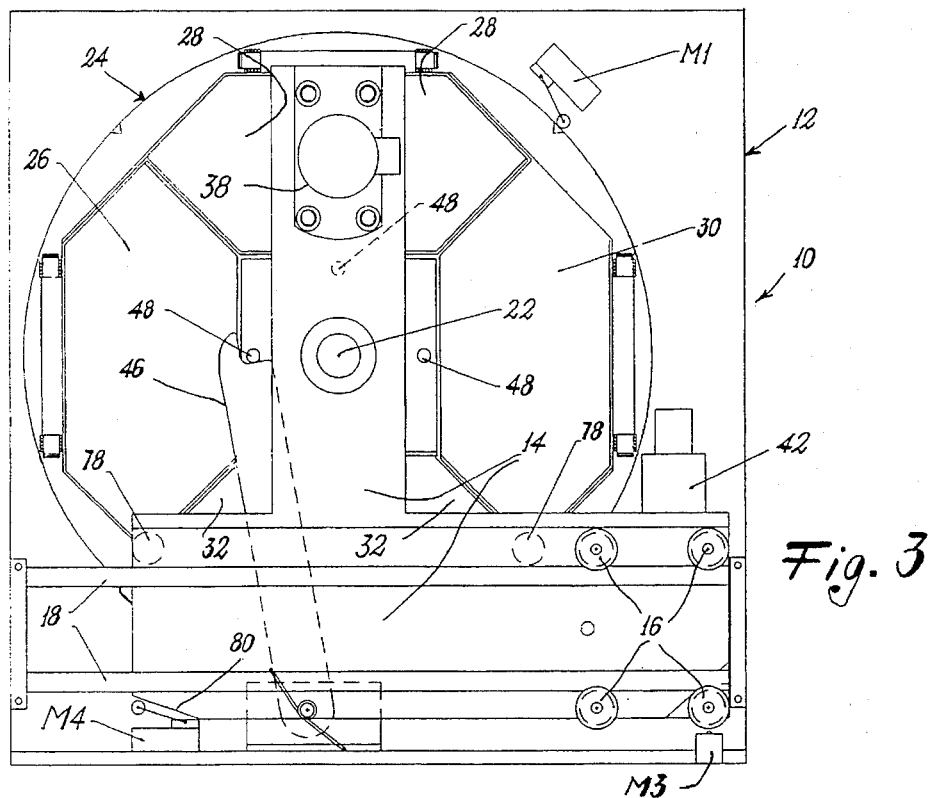
FIG. 3 is a view thereof in the direction of the arrow 3 of FIG. 1, the relative casing part being removed in this figure to show the interior.

As can be seen from FIG. 3, the compartments 26, 28, 30 and 32 are identical, they extend in a direction parallel to the shaft 22 and are spaced angularly equidistant about this shaft. In the illustrated embodiment their mouths on that side of the drum visible in FIG. 3 (known hereafter as the entry mouths) are open. These entry mouths can also be provided with a respective removable or rotatable closure cover, the presence of such covers not however being essential to the present invention.

The frame 4 also carries a hydraulically operated piston device, the purpose of which is to compress the refuse contained in any one compartment. The piston has the same shape as the cross-section of any compartment, but its dimensions are slightly smaller so as to enable the piston to move in the two directions within any one of the compartments. In the illustrated embodiment the piston is in the form of a presser plate 34 (FIG. 1) fixed to the end of the rod 36 of a cylinder/piston device 38. A hydraulic control unit 40 (FIG. 4) operates the cylinder/piston device 38 via a solenoid valve 42 (FIG. 3) to transmit to the presser plate 34 the necessary force for compressing to the desired extent the refuse contained in a given compartment.

As the frame 14 is slidable along the guides 18 whereas the control unit is fixed to the casing 12, flexible connection hoses 44 are provided between the control unit 40 and the cylinder/piston device 38.

A pawl 46 hinged to the guide rigid with the casing 12 is arranged to engage one of four angularly equidistant pins 48 fixed to the drum 24 at each of the four compartments 26, 28, 30, 32. This causes the drum 24 to rotate through 90° about its axis 22 for each outward and return stroke of the frame 14, and hence of the drum 24, along the guides 18. The centering lock 50 (FIG. 4) maintains the drum 24 in one of the four angular positions in which one of the four compartments of the drum 24 is in a position exactly corresponding with the presser plate 34.

Figure 4:
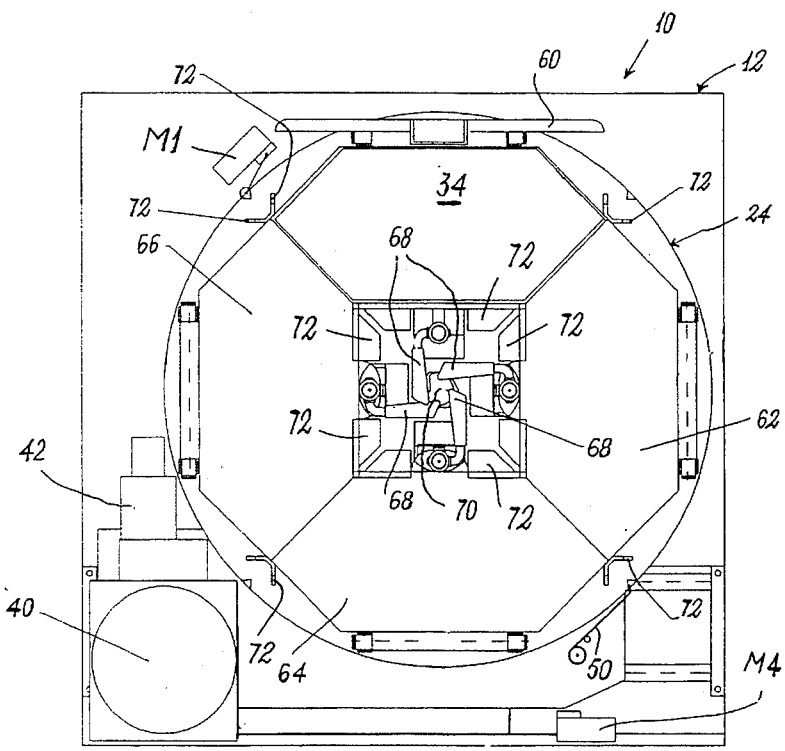
FIG. 4 is a view thereof in the direction of the arrow 4 of FIG. 1, the relative casing part also having been removed as in the case of FIG. 3.
Figure 5:
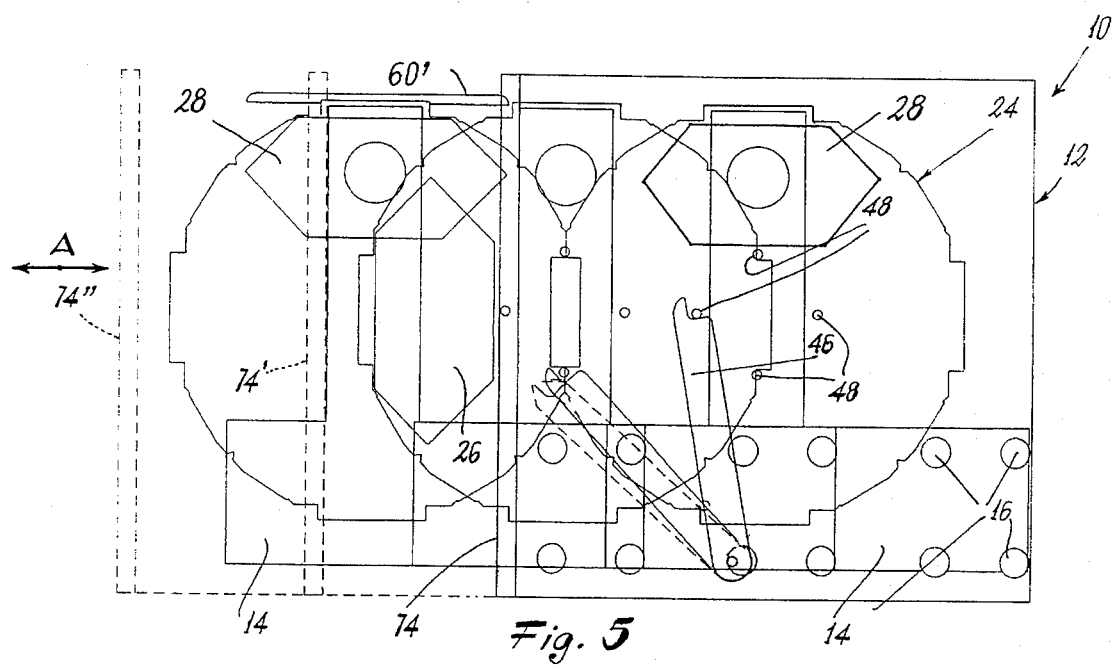
FIG. 5 shows schematically the position of the apparatus drum during different operating stages.

On that side of the drum 24 visible in FIG. 4, the compartments 26, 28, 30, 32 comprise an aperture, to be known as the exit aperture, closed by a respective cover (indicated respectively by 60, 62, 64, 66, of which the cover 60 is shown open). The exit covers are hinged to the outer edge of the drum 24 so that they can be opened by rotating them (as shown for the cover 60 in FIG. 4). Each cover is maintained closed by a usual mechanism comprising a stay bar 68 and a cam lever. The stay bar is hinged to the drum 24 and engaged in a slot provided in the cover so that if the stay bar 68 is not inserted into the slot with its lever in the closed position, it rests on the end 70 of the shaft 22 and projects beyond the overall outline of the drum 24. To prevent a cover being able to open as soon as the stay bar is removed, all covers are provided with preloaded springs which maintain them in their closed position. The drum 24 is also provided with suitable L-shaped elements 72 which enable a bag (not shown in the figures) of suitable dimensions to be applied to the exit aperture of each compartment to receive its contents. The bags are of a material suitable for the type of refuse to be contained. For example, biodegradable plastic bags can be conveniently used for paper or plastics refuse, whereas non-woven fabric bags can be usefully used for glass and metals.

The casing 12 enclosing the apparatus can be formed as a cabinet to be positioned for example below a kitchen sink, the cabinet having a front part 74 openable in the manner of a drawer (FIGS. 2 and 5) positioned rigid with the frame 14 in correspondence with the drum 24, and a front part 76 openable in the manner of a door (FIG. 2) in a position corresponding with the cylinder/piston device 38.

The operation of the illustrated sorter-compactor will now be briefly described.

The drawer 74 is extracted as far as its first opening position 74' (FIGS. 4 and 5), so that the compartment 26 (shown in FIG. 5) projects completely from the cabinet 12. It will be assumed for the moment that the compartment 26 is that intended for the particular type of refuse to be introduced into the sorter-compactor 10. It is then necessary merely to introduce the refuse through the entry aperture of the relative compartment 26 and then close the drawer 74. If the compartment 26, with the drawer in its first opening position (74'), is not that intended for the particular type of refuse, it is necessary merely to rotate the drum 24 with the hand in the release direction of the pawl 46 (clockwise with reference to FIG. 5) to make that compartment intended for the particular refuse accessible. Appropriate symbols and/or writings and/or colorations positioned on the various drum compartments facilitate the identification of the compartment intended for a particular type of refuse.

After closing the drawer 74, the pawl 46 acts on the pin 48 engaged by it to rotate the drum 24 through an angle of 90 degrees. That compartment into which the refuse has just been introduced hence passes from the position 26 to the position 28, to exactly correspond in position with the presser plate 34. An electrical enabling signal, generated automatically (for example on closure of the drawer 74) or manually, starts the pump of the hydraulic control unit 40 to feed pressurized oil to the double-acting cylinder/piston device 38, causing the presser plate 34 to advance within the compartment 28 with consequent compacting of the refuse contained in it. It should be noted that the thrust (eccentric to the axis 22 of the drum 24) on the refuse is discharged onto the relative cover closing the compartment exit aperture. The consequent inclination of the drum is countered by two feet 78 fixed to the frame 14 at the drum ribs, and against which the drum 24 bears as a result of said flexure. The small clearance between the feet 78 and drum 24 (which enables it to rotate) must be such that the flexure of the drum shaft 22 is contained within the elastic range.

The return of the presser plate 34 is achieved automatically by a pressure switch PS (FIG. 6) positioned on the delivery side of the hydraulic circuit, to operate the solenoid valve 42 controlling the hydraulic cylinder when a predetermined pressure is reached.

When refuse can no longer be introduced into the relative compartment either because this is full or the refuse would project out and hence hinder rotation of the drum 24, the contents of this compartment must be emptied into the relative collection bag. To do this the drawer 74 has to be completely extracted (second opening position 74" in FIG. 5) by firstly completely opening the adjacent door 76 so that the cylinder/piston device 38 can leave the cabinet 12 together with the drum 24. For greater strength and stability, the free end of the cylinder/piston device 38 can be secured to a rail fixed to the side of the casing 12 and extending along the inside of the door 76 via a joint. With the drawer 74 in this second opening position 74" there are no obstacles to the opening of the upper door 60 which closes the upper compartment 28, the compartment to be emptied having been previously moved into this upper position. On now removing the relative stay bar 68 from the corresponding slot in the cover 60 by operating its lever, the cover 60 will remain closed because of the preloaded springs, hence preventing undesirable escape of the compacted refuse from the compartment 28. A bag of a type suitable for the refuse to be discharged is now mounted over the discharge aperture (still closed by the cover 60) and fixed by the coupling elements 72. The bag can also be identifiable by symbols and/or writing and/or colorations reproduced on it and identical to those on the drum, which enable the type of refuse concerned to be identified at a glance.

An electrical enabling signal conveniently generated by direct action of the user (for example by means of a suitable pushbutton) causes the presser plate 34 to advance and consequently urge the already compacted refuse against the cover 60, which opens by rotating upwards against the action of the springs. Proceeding in its movement, the presser plate 34 expels all the refuse from the compartment 28, this material falling progressively into the bag. On reaching its end-of-travel position, the presser plate 34 projects slightly from the compartment, to hence engage the cover 60 and maintain it in a horizontal position (60') as in FIG. 4 (it is also visible in FIG. 1 but is shown by dashed lines). It can be arranged that on releasing the pushbutton, immediately after reversal of movement, the movement of the presser plate 34 is blocked to allow cleaning of the plate and of the relative cover. A gasket of oil-scraper type provided on the perimeter of the plate 34 ensures that the inner wall of the compartment 28 remains clean. Automatic controls can also be provided so that the presser plate 34 returns to its initial position automatically.

Figure 6:
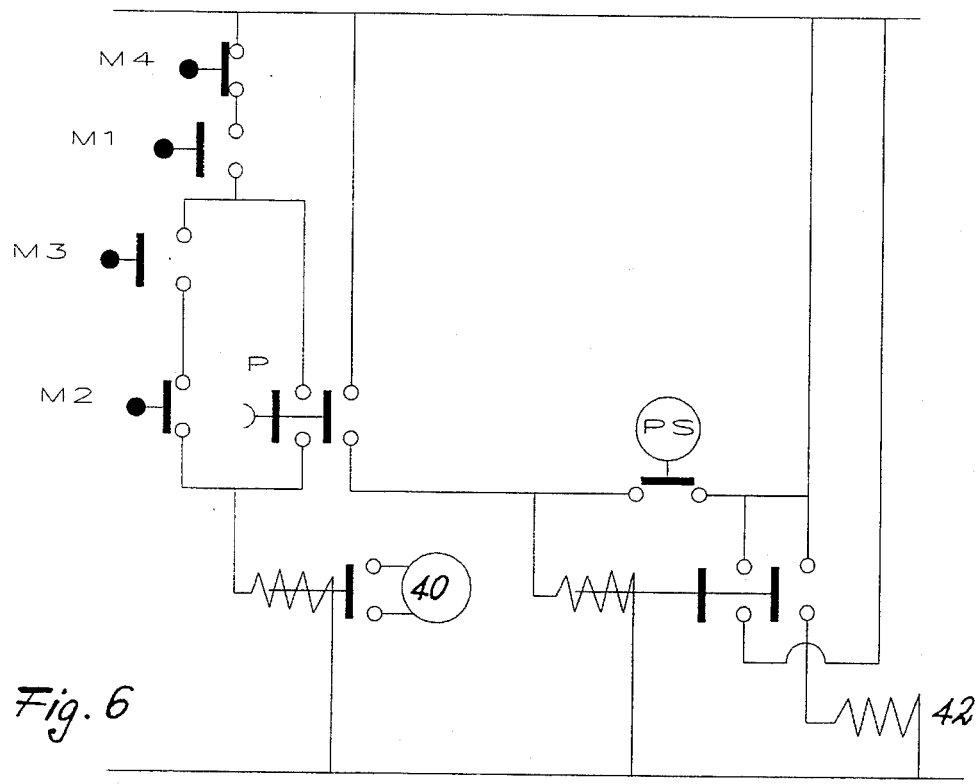
FIG. 6 is a possible electrical schematic for the apparatus of the preceding figures.

With reference to FIG. 6, a description will now be given of the electrical operation of the sorter-compactor 10 of FIGS. 1 to 5.
a) Loading stage:
the drum 24 is in phase (ie one of the compartments is exactly in front of the presser plate 34) and closes an in-phase microswitch M1 (see also FIG. 3);
the covers 60, 62, 64, 66 are all closed;

the drawer 74 is partially extracted (first opening position 74'), so that the circuit of a second microswitch M4 is opened by a suitable contour 80 (see also FIG. 3) provided in proximity to the guides 18; the hydraulic pump 40 (FIG. 4) can be operated only with the drawer 74 closed or completely open (second opening position 74"), given that the circuit of M1 is closed only in these positions;

the presser plate 34 is in its retracted position, in which it opens the circuit of a limit microswitch M2.

b) Compacting stage:

the drum 24 is in phase and closes the circuit of the in-phase microswitch M1;

the covers 60, 62, 64, 66 are all closed and locked in their closed position (otherwise the drawer 74 cannot totally withdraw into the cabinet 12 because the lever of the relative stay bar 68 would interfere with the cabinet if the stay bar is not inserted into the corresponding slot in the relative cover and closed); a safety bar 82 (FIG. 1) is provided within the cabinet in front of the covers at the level of the presser plate to operate a microswitch (not shown) which blocks all movements if accidentally operated;

the presser plate 34 is in its retracted position, so that by pressing against the limit microswitch M2 it opens its circuit;

the drawer 74 is closed, so that the circuit of the microswitch M4, disengaged from the contour 80, is closed, as is the circuit of a rear limit microswitch M3 (FIG. 3), this being pressed by the drawer 74;

on receiving the enabling signal, given for example by the user by pressing a pushbutton P, the hydraulic pump 40 operates to force out the rod 36 of the cylinder/piston device 38; when the necessary time has passed for the presser plate 34 to disengage from the microswitch M2 (which closes), said pushbutton can be released, so that the plate 34 continues to advance and compress the refuse;

during this compression the delivery pressure of the hydraulic circuit rises and, on reaching a predetermined value, opens the circuit comprising the pressure switch PS (FIG. 6), causing the solenoid valve controlling the cylinder/piston device to switch over; The presser plate hence reverses its movement and at the end of its return travel again operates the relative microswitch M2, hence opening its circuit with consequent stoppage of the pump 40 and of the movement of the presser plate 34.

c) Extraction stage:

the drum 24 is in phase and closes the in-phase microswitch M1;

the covers 62, 64, 66 of the respective compartments 30, 32, 34 are closed whereas the upper cover 60 is open;

the drawer 74 is completely extracted from the cabinet (position 74"), so that the circuit of the microswitch M4, disengaged from the contour 80, is closed and the circuit of the rear limit microswitch M3 is open;

the presser plate 34 is in its retracted position, so that the circuit of the limit microswitch M2 is open;

the electric pushbutton P, operated manually, activates the hydraulic pump 40 to cause the presser plate 34 to advance;

when the presser plate 34 reaches its end-of-travel position the hydraulic circuit delivery pressure rises to a predetermined value, on attaining which the circuit of the pressure switch PS opens to switch over the solenoid valve controlling the cylinder/piston device 38, so that the presser plate reverses its movement;

the pushbutton P can be released at any moment to halt all movement either for safety reasons or to allow easy cleaning of the presser plate and cover.

Conveniently, when the presser plate reaches its end-of-travel position an indicator lamp connected to the pressure switch PS indicates the reversal of the presser plate movement (meaning that the bag can now be removed and the cover and plate cleaned). Again conveniently, when the presser plate 34 reaches its most retracted position, an indicator lamp connected to the microswitch M2 indicates this end-of-cycle position of the machine, which is hence available for a new cycle.

The sorter-compactor apparatus 110 of FIG. 6 differs from the already illustrated and described apparatus 10 mainly in that the drum 124 is rotatable about a vertical axis, because of which the piston device (of which the exterior of the cylinder 138 of the cylinder-piston operating device is visible in the figure) also acts in a vertical direction. The drum 124 is projectingly suspended on a support frame 144 the upper part 112 of which is encased. In the casing 112 there is provided a door 113 which allows access to the compartments of the drum 124. This latter is provided with handles 45 which facilitate its rotation.

Figure 7:
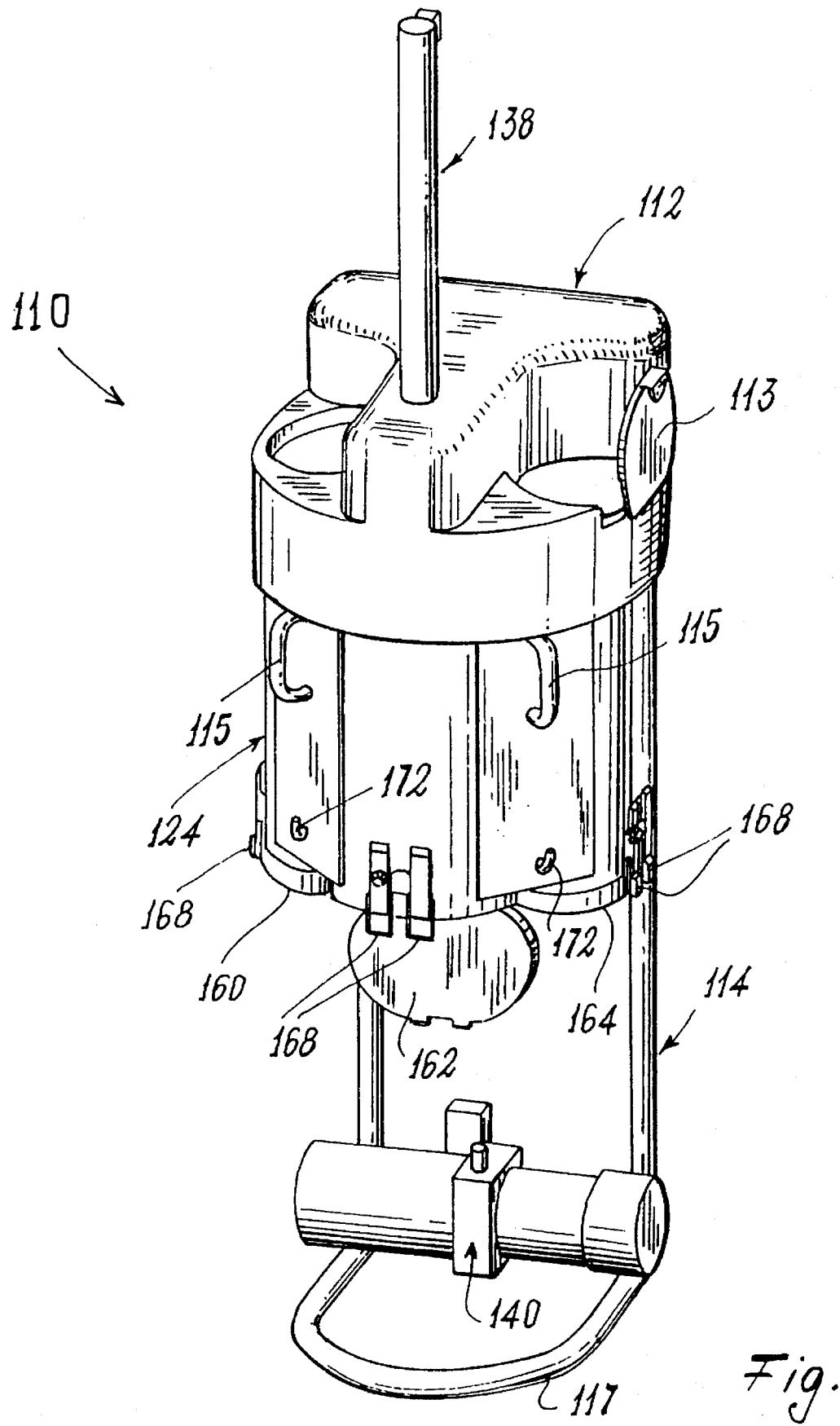
FIG. 7 is a perspective view of a vertically extending modified embodiment of the apparatus according to the invention.

For simplicity, the apparatus 140 is not provided with a pawl of the type (46) provided in the apparatus 10, the apparatus 110 being provided instead with positioners (not shown in FIG. 7) which enable the presser plate to be aligned with the compartment in which the compression action is to be provided.

The base of the compartments (which are also four in number in this case, but could also be more or less in number) is also in this case closed by a cover (the figure shows only three, indicated by 160, 162 and 164, of which the cover 162 is in the open position). The covers are maintained closed by relative locking mechanisms 468.

The hooks 172 and other suitable means enable a relative bag to be applied to the exit aperture of each compartment to collect the refuse expelled therefrom.

As in the case of the apparatus 10, the version 140 is also provided with a hydraulic control unit for operating the cylinder-piston device 138. The frame 144 is provided with an arched support foot 147.

I claim:

1. A sorter-compactor (10;110) for urban refuse, comprising:

a sorting drum (24;124) rotatable about its axis (22), the drum being provided with at least two compartments (26,28,30,32) of identical shape and dimensions, of which each compartment, intended to receive one type of refuse, extends parallel to the axis of rotation (22) of the drum (24;124), has a constant cross-section along its entire length and has at least one of its two open ends closable by a relative cover (60,62,64,66;160,162,164, 166); and a compacting device (34,38;138) comprising a presser plate (34) slidable in two directions within any one of the compartments (26,28,30,32) when the presser plate (34) is located in correspondence with that compartment, and an actuator (38;138) for operating the presser plate (34) in the two directions so as to cause said presser plate (34) to move within said compartments (26,28,30,32) and compress the refuse contained in the relative compartment against the corresponding closure cover (60,62,64,66;160,162,164,166).

2. A sorter-compactor (10) as claimed in claim 1, wherein an outer casing (12) is provided together with a frame (14) movable relative to the casing (12) in the two directions in the manner of a drawer (74), the drum (24) and the compacting device (34, 38) being mounted on the frame, and a pawl (46, 48) being provided to rotate the drum (24) through a predetermined angle following an opening-closure sequence of the drawer (74) so as to move the compartment containing the refuse to be compacted into an angular in-phase position exactly corresponding with the compacting device (34, 38).

3. A sorter-compactor (10; 110) as claimed in claim 2, wherein the compartments (26, 28, 30, 32) are four in number.

4. A sorter-compactor as claimed in claim 2, further comprising means for positioning a respective bag for collecting the compressed refuse from each of said compartments.

5. A sorter-compactor (10) as claimed in claim 4, wherein the drawer (74) has two opening positions, namely a first position (74') in which the drawer is partially open enabling the refuse to be loaded into a certain compartment, and a second position (74") in which the drawer is completely open allowing the compartments to be emptied.

6. A sorter-compactor (10) as claimed in claim 5, wherein when the drawer (74) is in its second opening position (74") the respective bag can be fitted to the drum (24) in correspondence with the compartment to be emptied, and the compacted refuse contained in said compartment be made to fall into the bag by operating the compacting device (34, 38).

7. A sorter-compactor as claimed in claim 5, further comprising indicator means for indicating whether said drawer is in its closed position.

8. A sorter-compactor as claimed in claim 2, further comprising detecting and enabling means for detecting whether the drum is in the in-phase position and for enabling the compacting device to operate when the drum is in the in-phase position.

9. A sorter-compactor (10) as claimed in claim 8, wherein said means are a microswitch (M1) operable by a counteracting member provided on the drum.

10. A sorter-compactor (10) as claimed in claim 8 wherein means (M4) are provided to detect whether the drawer is in its closed position or in its second opening position (74"), said enabling means enabling the compacting device (34, 38) to operate only if the drum (24) is in the in-phase position and the drawer (74) is in its closed position or in its second opening position (74").

11. A sorter-compactor (10) as claimed in claim 10, wherein said means consist of a microswitch (M4) operable by a counteracting contour when the drawer is in its closed position or in its second opening position (74").

12. A sorter-compactor as claimed in claim 1, further comprising detecting and indicator means for detecting and indicating the presence of the presser plate in its most retracted position.

13. A sorter-compactor (10) as claimed in claim 12, said detecting and indicator means are a microswitch.

14. A sorter-compactor (10) as claimed in claim 1 wherein means are provided for detecting if the cover is accidentally opening during the compacting stage, together with means for disenabling the compacting device if such a situation is detected.

15. A sorter-compactor for refuse, comprising:

a sorting drum rotatable about an axis, said sorting drum including at least two elongate compartments receivable of refuse, each of said compartments extending in a direction parallel to the axis of rotation of said sorting drum and having first and second opposed, open ends, cover means for covering said first end of each of said compartments, pressing means arranged to move into engagement with refuse contained within one of said compartments when said pressing means is located in correspondence with said one of said compartments, and actuator means for moving said pressing means in a first direction through said second end of said one of said compartments into said one of said compartments to compress the refuse contained in said one of said compartments against said cover means and in a second direction out of said one of said compartments after said pressing means have compressed the refuse contained in said one of said compartments.

16. The sort-compactor of claim 15, wherein each of said compartments has a uniform cross-sectional shape, said pressing means comprising a presser plate having substantially the same shape as said cross-sectional shape of said compartments such that said presser plate is movable with a minimal clearance within each of said compartments.

17. The sorter-compactor of claim 15, wherein said actuator means comprise a cylinder/piston device and a movable elongate rod coupled at a first end to said cylinder/piston device, said rod being coupled at a second end to said pressing means.

18. The sorter-compactor of claim 17, wherein said actuator means further comprise a hydraulic control unit for controlling said cylinder/piston device and flexible hose means for coupling said hydraulic control unit to said cylinder/piston device.

19. The sorter-compactor of claim 15, wherein said cover means are releasable such that compressed refuse in said compartments is removable in an axial direction from said compartments through said first end of said compartments.

20. The sorter-compactor of claim 15, further comprising a shaft on which said sorting drum is mounted, said sorting drum comprises four of said compartments spaced angularly equidistant about said shaft, and means for maintaining said sorting drum in one of four angular positions in which one of said four compartments is in correspondence with said pressing means.

\* \* \* \* \*